United States Patent
Easley

(10) Patent No.: US 10,618,587 B2
(45) Date of Patent: Apr. 14, 2020

(54) BRACKET AND CONVERTIBLE LUGGAGE SYSTEM FOR A MOTORCYCLE

(71) Applicant: Wesley R. Easley, Petaluma, CA (US)

(72) Inventor: Wesley R. Easley, Petaluma, CA (US)

(*) Notice: Subject to any disclaimer, the term of this patent is extended or adjusted under 35 U.S.C. 154(b) by 193 days.

(21) Appl. No.: 15/986,061

(22) Filed: May 22, 2018

(65) Prior Publication Data

US 2019/0359278 A1    Nov. 28, 2019

(51) Int. Cl.
*B62J 9/00*    (2020.01)
*A45F 3/04*    (2006.01)
*A45F 4/02*    (2006.01)

(52) U.S. Cl.
CPC .... *B62J 9/00* (2013.01); *A45F 3/04* (2013.01); *A45F 4/02* (2013.01); *A45F 2004/023* (2013.01)

(58) Field of Classification Search
CPC ......... A45C 2003/005; B62J 7/00; B62J 7/04; B62J 9/00
USPC .................................................. 224/429–431
See application file for complete search history.

(56) References Cited

U.S. PATENT DOCUMENTS

| | | | |
|---|---|---|---|
| 3,786,972 A * | 1/1974 | Alley .................. | B62J 9/00 224/417 |
| 3,937,374 A * | 2/1976 | Hine, Jr. .............. | B62J 9/00 224/430 |
| 4,260,084 A | 4/1981 | Warren, Jr. | |
| 4,491,258 A * | 1/1985 | Jones ................... | B62J 9/00 224/153 |
| 4,580,706 A * | 4/1986 | Jackson ............... | B62J 9/00 224/417 |
| 4,979,658 A | 12/1990 | Baker | |
| 5,050,713 A * | 9/1991 | Lee ...................... | A45C 7/0086 150/110 |
| 5,562,236 A * | 10/1996 | Monzingo ............ | A45C 7/0086 224/153 |
| 5,609,278 A * | 3/1997 | Fresco ................. | A45C 5/14 224/153 |
| 5,765,733 A * | 6/1998 | Brule ................... | A45F 3/04 224/153 |
| 5,810,230 A * | 9/1998 | Nutto ................... | B62J 7/04 224/417 |
| 8,844,778 B2 | 9/2014 | St. Georges | |
| D723,980 S * | 3/2015 | Simons ................ | D12/114 |
| 10,464,625 B2 * | 11/2019 | Kang .................... | B62J 9/006 |
| 2002/0053583 A1 * | 5/2002 | Aldrich ................ | B62J 9/00 224/413 |
| 2004/0232183 A1 * | 11/2004 | Watanabe ............. | B62J 9/001 224/413 |

* cited by examiner

Primary Examiner — Joshua T Kennedy

(57) ABSTRACT

A luggage system for motorcycles whose cases, when removed from the motorcycle, can quickly be configured into a backpack. The disclosed invention comprises two brackets for attachment to the motorcycle, two large cases for carrying heavy equipment that have mirror image backpack straps built into them, and up to four accessory packs for carrying smaller items. The large cases have mating separating zipper components which, when zipped together, create a backpack.

6 Claims, 8 Drawing Sheets

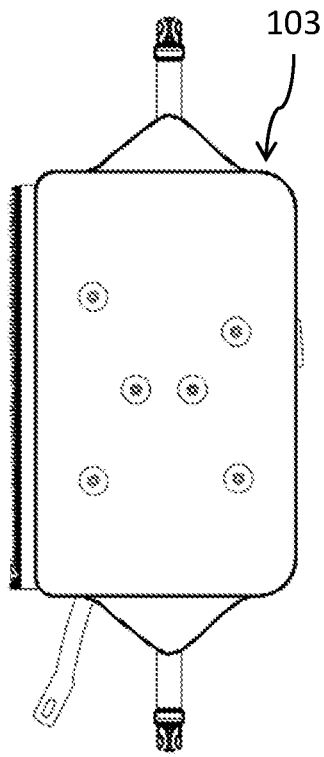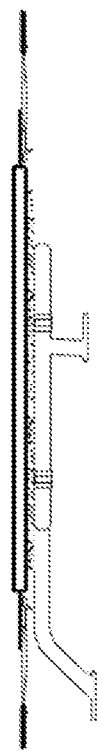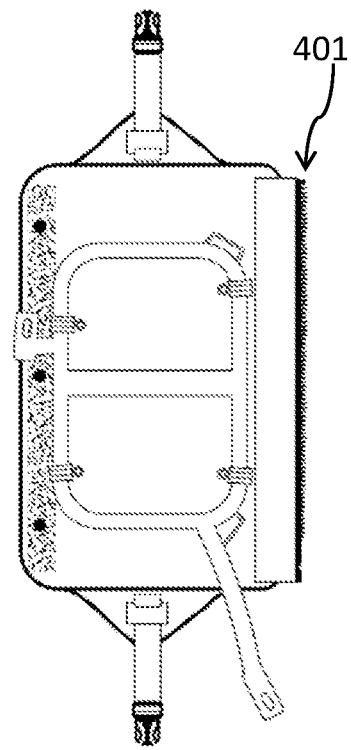
Fig. 4a    Fig. 4b    Fig. 4c
Fig. 4

(Right Case)

(Left Case)

(Left Case)

(Right Case)

BRACKET AND CONVERTIBLE LUGGAGE SYSTEM FOR A MOTORCYCLE

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates generally to luggage for motorcycles. More specifically, the present invention relates to luggage and a luggage mounting method for motorcycles wherein the luggage pieces are easily removed and assembled together to form a backpack.

2. Description of the Related Art

Motorcycles are often used by members of the armed forces to enter difficult terrain or territory for tactical missions. Such missions require specialized technical equipment that can be heavy and somewhat bulky. Traditionally, the equipment has been packed into carrying cases on the backs of the motorcycles. Re-installing the equipment into the carrying cases can be time consuming, and when pressed in a tight situation, soldiers have often had to abandon the equipment because they simply did not have time to re-pack it. A luggage system is needed that will offer the flexibility for soldiers to quickly carry out their equipment without re-packing it onto the motorcycle.

Historically, luggage used for motorcycles has been in the form of a saddle bag or saddle pack. Conventional saddle bags are well known in the art and have been used for many years for the purpose of carrying personal items on horseback, snowmobiles, motorcycles or bicycles. Many methods of attaching saddle bags have been developed for motorcycles in particular, for example: U.S. Pat. No. 8,844,778 issued to St. Georges Sep. 30, 2014, discloses an adapter bracket for supporting a saddle bag on a motorcycle that attaches to a rear fender strut of the motorcycle; U.S. Pat. No. 4,580,706 issued to Jackson et. al. Apr. 8, 1986 discloses a method using straps to connect two saddle packs to the seat of a motorcycle, which can then be removed and carried as luggage; and U.S. Pat. No. 4,260,084 issued to Warren, Jr. Apr. 7, 1981 discloses a very rigid structural support designed to carry pieces of hard luggage on the back of a motorcycle in a saddle pack style. Each of the foregoing inventions does not have the attachment strength required to carry heavy military equipment, and also does not have an easily reconfigured carrying capability that would allow a soldier to escape with the equipment without having to re-pack it on the motorcycle.

The best way for a soldier to carry the equipment would be to convert the luggage to a backpack which can be quickly donned and will not interfere with operation of the motorcycle. U.S. Pat. No. 4,979,658 issued to Baker Dec. 25, 1990 discloses a backpack/saddlebag system that includes three items of luggage that are attached to a motorcycle with straps and snap hooks. Those three items can then be removed from the motorcycle and assembled together to form a piece of luggage that can be carried on one's back, similar to a back pack. The carrying volume of these items of luggage, however, is restricted by their shape and, although some attempt has been made to strengthen the product with a "stiffening grid," the load capacity is necessarily quite low.

The present invention addresses these issues by providing a luggage system for a motorcycle that includes large cases with quick release straps and zippers. The attachment mechanism to the motorcycle, and the cases themselves, are strong enough to carry heavy electronic equipment. The cases can be configured to carry specific tactical equipment so the equipment does not have to be removed from the case in order to be operated. The exterior of each case is configured so they can be quickly assembled into a backpack arrangement. If soldiers are suddenly pressed in a dangerous situation, they can quickly close up the cases, assemble them into a backpack, jump on the motorcycle, and escape to safety.

BRIEF SUMMARY OF THE INVENTION

The present invention comprises two brackets, two large cases for carrying equipment, and up to four accessory packs. The brackets are large rectangular frames with steel extensions that are configured to be bolted to the standard frame mounting locations on the foot pegs and tail of a motorcycle. Each bracket has a half-zipper along the bottom of the frame, a quick release attachment mechanism along the top of the frame, and two straps with heavy duty quick release buckle clips on the sides. The cases have matching attachment mechanisms and are mounted to the brackets during transport. The bracket has sufficient strength in its structure and attachment straps to carry military tactical equipment saddlebag style on a military grade motorcycle. The removable cases are constructed of heavy-duty material and each has one backpack arm strap and one waist support strap. When removed from the brackets, the cases are connected together and the two backpack straps and waist support straps form the straps of a single backpack assembly. Additional accessory packs which can be attached to the top and bottom of the backpack assembly are designed to be mounted to the motorcycle on the front shocks, the tail plate and the center tank.

BRIEF DESCRIPTION OF THE SEVERAL VIEWS OF THE DRAWINGS

A more complete understanding of the present invention may be derived by referring to the detailed description and claims when considered in connection with the figures, wherein like reference numbers refer to similar items throughout the figures and:

FIG. 4 shows various views of the right bracket where FIG. 4a is the external side when installed on the motorcycle, FIG. 4b is the side view, and FIG. 4c is the side that mounts to the motorcycle;

DETAILED DESCRIPTION OF THE INVENTION

In the following detailed description of the invention, reference is made to the accompanying drawings which form a part of the disclosure and, which show by way of illustration, and not of limitation, specific embodiments by which the invention may be practiced. The drawings, the foregoing discussion, and the following description are exemplary and explanatory only, and are not intended to limit the scope of the invention or its application in any manner.

Figure 1:
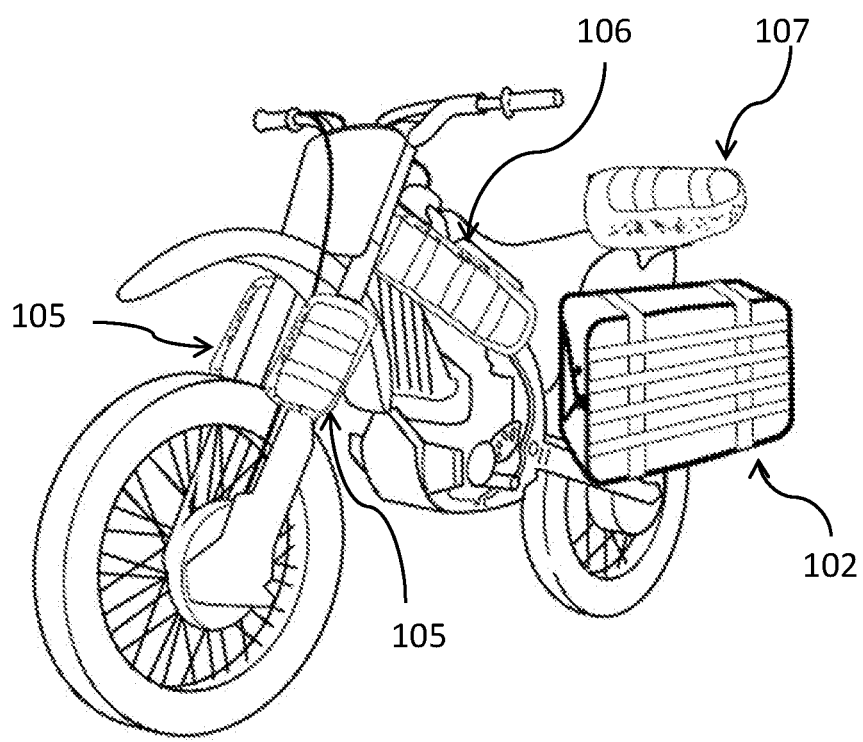
FIG. 1 is a side view of a motorcycle showing the left case, the two front shock accessory packs, the tank accessory pack and the tail plate accessory pack installed for transport.
Figure 2:
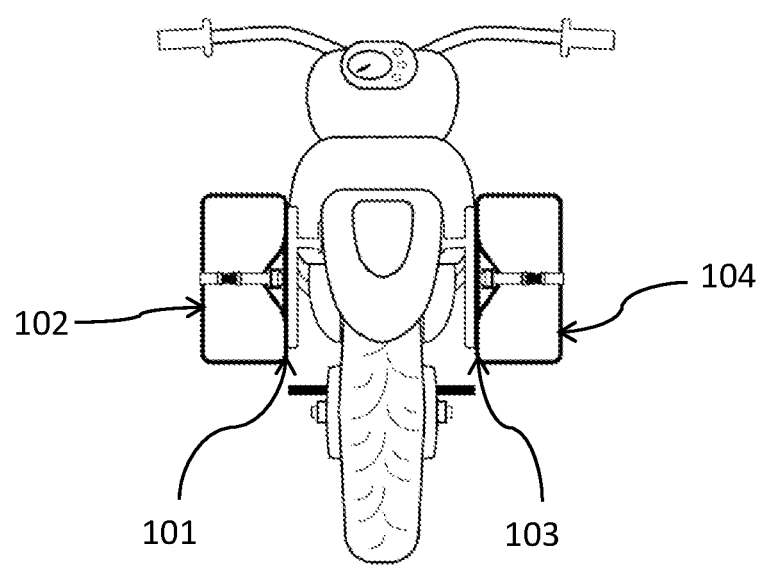
FIG. 2 is a view of the back of the motorcycle that shows the back of the two brackets with the cases installed without the additional accessory packs.
Figures 3, 3A, 3B, 3C:
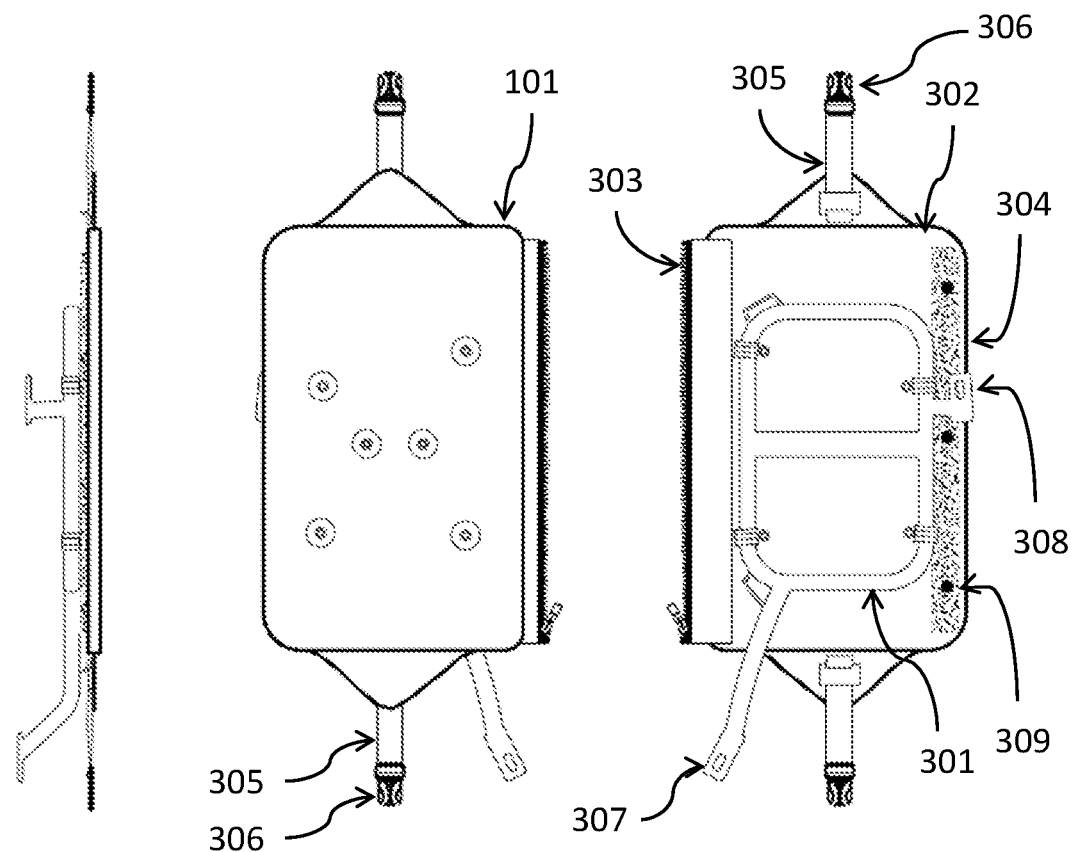
FIG. 3 shows various views of the left bracket where
FIG. 3a is the side view.
FIG. 3b is the external side when installed on the motorcycle.
FIG. 3c is the side that mounts to the motorcycle.

The present invention is a Bracket and Convertible Luggage System for a Motorcycle comprising at least a Left Bracket 101, a Left Case 102, a Right Bracket 103, and a Right Case 104. The system may also include any combination of two Front Shock Mounted Accessory Bags 105, a Tank Mounted Accessory Bag 106, and a Tail Plate Mounted Accessory Bag 107. The optional Accessory Bags 105, 106, and 107 are attached to the motorcycle with heavy duty hook and loop fastener attachments as shown in FIG. 1. The size and shape of each accessory bag can be adjusted to accommodate specific equipment, as needed.

The Left Bracket 101 consists of a structurally rigid Left Frame 301, a large Flat Surface Plate 302, a Bottom Attachment Mechanism 303 along the bottom length, a Top Attachment Mechanism 304 along the top length, and two Side Straps 305 with heavy duty quick release Buckle Clips 306. The Left Frame 301 has Attachment Points 307 and 308 that allow attachment with bolts to frame mounting locations of a standard military motorcycle such as a Kawasaki KLSR. The Left Frame 301 is attached to the Flat Surface Plate 302 by any suitable method such as with welds, bolts or structurally strong clips. All components are of suitable strength and attachment capability to carry at least a fifty pound weight in the Left Case 102. In a preferred embodiment, the Bottom Attachment Mechanism 303 is the slider side of a heavy duty separating zipper, and the Top Attachment Mechanism 304 is the loop side of a heavy duty hook and loop fastener with Snap Receptacles 309. In an alternate embodiment, the Left Frame 301 and Flat Surface Plate 302 may be made from a single piece.

As shown in FIG. 4, the Right Bracket 103 is a mirror image of the Left Bracket 101, except that its Bottom Attachment Mechanism 401 is the receptacle side of a heavy duty separating zipper.

Figures 5, 5A, 5B:
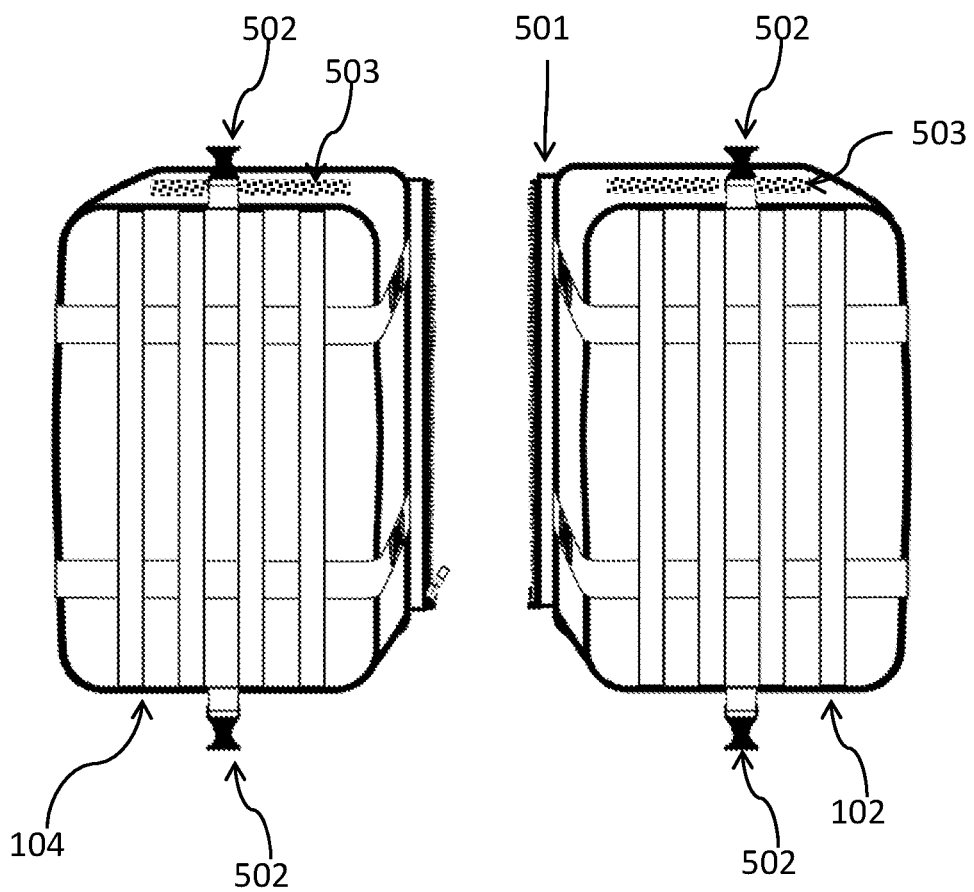
FIG. 5 shows the exterior side of the left and right cases where
FIG. 5a is the right case and FIG. 5b is the left case.
Figures 6, 6A, 6B:
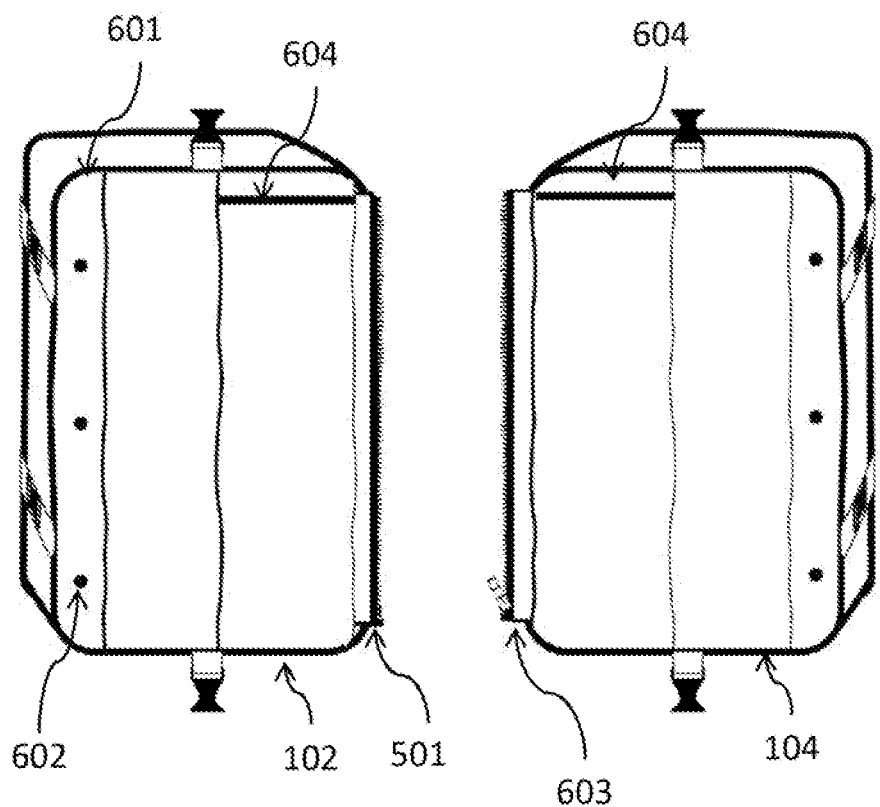
FIG. 6 shows the mounting side of the left and right cases with the backpack straps stowed in their pockets, where
FIG. 6a is the left case and FIG. 6b is the right case.

As shown in FIG. 5, the Left Case 102 has a Lower Attachment Mechanism 501 designed to attach to the Bottom Attachment Mechanism 303 of the Left Bracket 101. In a preferable configuration this is the receptacle side of the heavy duty separating zipper. As shown in FIG. 6, the Left Case 102 has a Top Attachment Mechanism 601 that is a flap of material with the hook side of a heavy duty hook and loop fastener on the inside surface and Snap Inserts 602 that match the Top Attachment Mechanism 304 of the Left Bracket 101. As shown in FIGS. 5 and 6, the Right Case 104 is a mirror image of the Left Case 102, except that its Bottom Attachment Mechanism 603 is the slider side of a heavy duty separating zipper.

Each Case has one quick release Buckle Clip Receptor 502 on each end of the case for connection to the Side Straps 305 and Buckle Clips 306 on their respective brackets. To install each case onto its bracket, the soldier places the case flat against the bracket and folds the hook and loop closure flap over the top, securing it with the snaps. The soldier then connects the separating zipper along the bottom edge and connects the front end and back end straps with their quick release buckle clips to secure the case in place. To remove the cases from the motorcycle, the soldier releases each case from its bracket by unclipping the Buckle Clips 306, unzipping the bottom to release the case from the bracket and then lifting the case off the bracket by releasing it from the hook and loop fastener and snaps.

Figure 7:
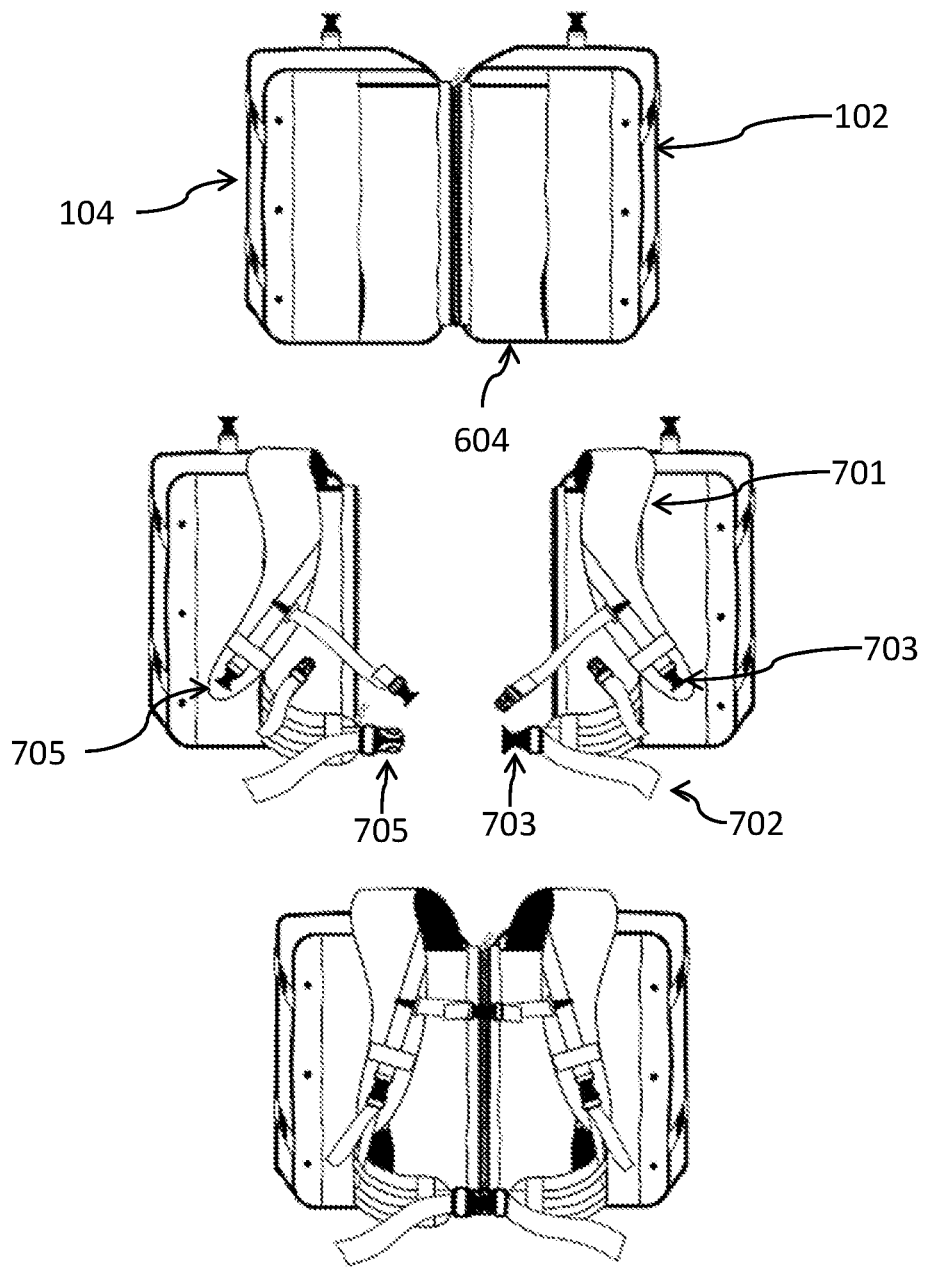
FIG. 7 shows the left and right cases and how they connect into a backpack configuration.

As shown in FIG. 7, the Left Case 102 has a Left Back Pack Strap Assembly 701, a Left Waist Support Strap Assembly 702 and an External Pocket 604 to stow them in. Each strap assembly has quick release Buckle Clip Receptors 703 on the ends. The Right Case 104 has mirror image straps with matching quick release Buckle Clips 705. Upon removal of each case from its bracket, the cases can be connected together as shown in FIG. 7 using their Lower Attachment Mechanisms 501 and 603 to create a backpack configuration.

Figure 8:
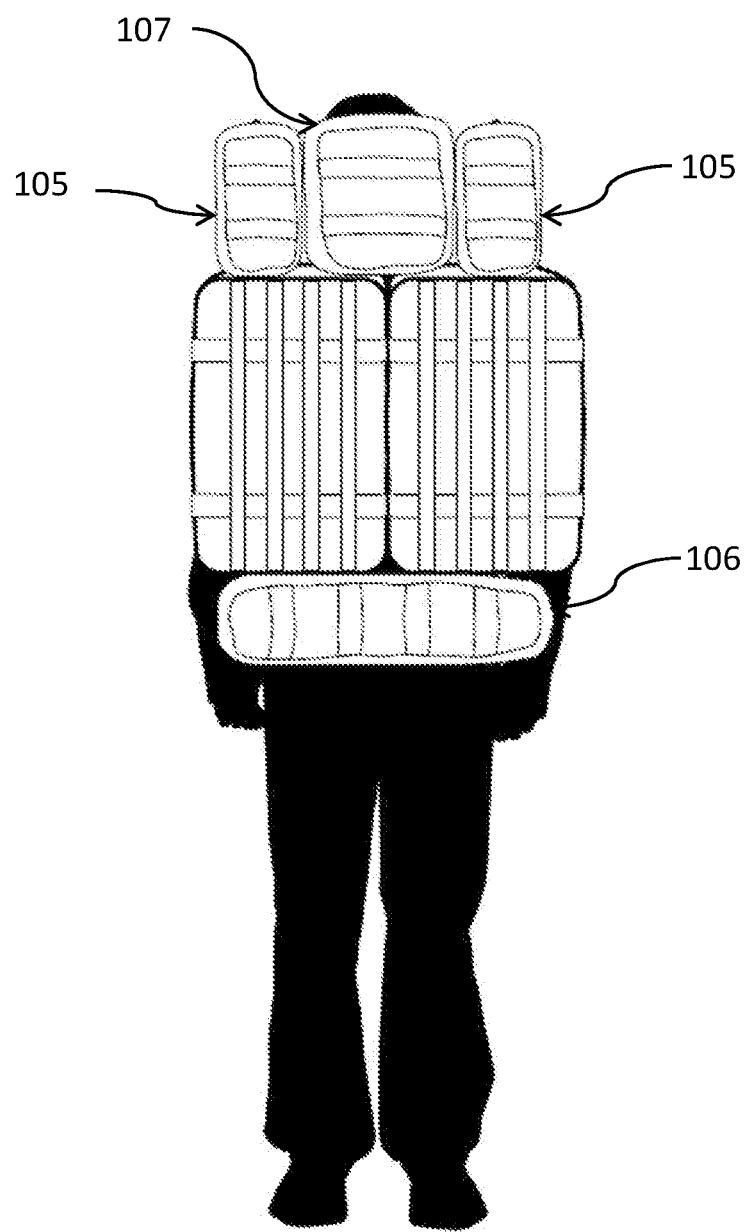
FIG. 8 shows the complete backpack assembly as worn with the optional accessory bags installed.

The Left and Right Cases 102 and 104 are preferably designed for specific tactical equipment. The structure and materials chosen will depend on the size, weight and shape of the tactical equipment. The interior of each case is preferably filled with foam that has cut-outs designed for the equipment so that it can be operated without removing it from the case. The exterior of each case may have the Hook side of hook and loop closures 503 on the top and bottom as shown in FIG. 5. When assembled into the backpack configuration, the ends of the cases become the top and bottom of the backpack and the optional Accessory Bags 105, 106, and 107 can be attached to the assembly via their matching hook and loop fasteners as shown in FIG. 8. If the Accessory Bags will carry somewhat heavier equipment, additional straps can be added to the exterior of the cases to secure the bags when installed to the backpack assembly.

Many modifications and variations of this invention may be made without departing from its spirit and scope, as will be appreciated by those skilled in the art. For example, the interior of the cases can be configured to hold photographic equipment for journalists, photographers or videographers, or specialized rescue equipment for first responders. The specific embodiments described herein are offered by way of example only. The embodiments were chosen and described in order to best explain the principles of the invention and its practiced applications.

What is claimed is:

1. A convertible luggage system for a motorcycle comprising:
    a left case in the shape of a cuboid with a mounting side, an external side that is opposite the mounting side, a top side, a bottom side, a front end, and a back end, where the external side has a zipper opening around three edges such that it can be opened as a suitcase, the mounting side has a right shoulder backpack strap attached at a front end edge, an insertion pin side of a separating zipper along a bottom edge, a flap with a strip of a hook side of a hook and loop closure on its inside along an edge of the top side, and straps with a receptacle end of quick release buckle clips on an edge between the external side and the front end and back end;

a left rear bracket consisting of a rigid panel, rectangular in shape, that is securely attached to a frame that is configured to be bolted to a side of the motorcycle, the rigid panel having a top edge, a bottom edge, a front edge, a back edge, and a frame side, wherein the bottom edge has a slider side of a separating zipper that matches the insertion pin side of the separating zipper on the left case, a strip of a loop side of the hook and loop fastener along the top edge on the frame side, and the front and back edges have straps with insertion ends of quick release buckle clips that match the receptacle ends of the quick release buckle clips on the left case;

a right case which is an identical mirror image of the left case except that instead of the insertion pin side of the zipper on the mounting side, it has a matching slider side of the separating zipper on the mounting side; and a right rear bracket which is an identical mirror image of the left rear bracket except that instead of the slider side of the separating zipper it has an insertion pin side of the separating zipper that matches the slider side of the separating zipper on the right case, wherein the left and right cases can be secured to the left and right rear brackets, respectively with the hook and loop closure, the zippers, and the quick release buckle clips, and wherein when the cases are removed from the left and rear brackets, they can be zippered together to form a backpack.

2. The convertible luggage system of claim 1 wherein the left case has a right waist backpack strap attached the mounting side perpendicular and adjacent to the back end, and the right case has a left waist backpack strap attached to the mounting side perpendicular and adjacent to the back end.

3. The convertible luggage system of claim 2 wherein the left and right cases have cloth pockets on the mounting sides in which their respective waist straps can be stowed.

4. The convertible luggage system of claim 3 with at least one snap receptacle on the hook sides of the hook and loop fasteners and a matching snap insertion piece on the flaps of the respective cases.

5. The convertible luggage system of claim 4 where both cases have an additional hook side of a hook and loop fastener covering the front end and the back ends, hook sides of strips of hook and loop fasteners that are configured to be glued to a motorcycle, two front shock mounted accessory bags, each having a loop side of a hook and loop fastener around all edges, a tank mounted accessory bag having a loop side of a hook and loop fastener around all edges, and a tail plate mourned accessory bag having a bottom, a mounting side, and two vertical sides with a loop side of a hook and loop fastener on the bottom and the mounting side and a hook side of a hook and loop fastener on the two vertical sides such that, when the cases are connected together to form a backpack, the tank mounted accessory bag can be attached to the bottom sides of the cases, the tail plate mounted accessory bag can be attached to the top sides of the cases, and the front shock mounted accessory bags can be attached to the top sides of the cases on either side of the tail plate mounted accessory bag.

6. The convertible luggage system of claim 1 wherein the left and right cases have cloth pockets on the mounting sides in which their respective shoulder straps can be stowed.

* * * * *